United States Patent
Kotani et al.

(10) Patent No.: US 6,626,609 B1
(45) Date of Patent: Sep. 30, 2003

(54) WATER STORING BLOCK AND CONNECTING MEMBER FOR WATER STORING BLOCK AND RAIN WATER STORING/INFILTRATING STRUCTURE

(75) Inventors: Tetsuho Kotani, Osaka (JP); Atsuo Shiode, Osaka (JP)

(73) Assignee: ECO-Plan 21 Co., Ltd., Osaka (JP)

( * ) Notice: Subject to any disclaimer, the term of this patent is extended or adjusted under 35 U.S.C. 154(b) by 0 days.

(21) Appl. No.: 09/869,024

(22) PCT Filed: Apr. 12, 2000

(86) PCT No.: PCT/JP00/02359

§ 371 (c)(1),
(2), (4) Date: Oct. 15, 2001

(87) PCT Pub. No.: WO01/29332

PCT Pub. Date: Apr. 26, 2001

(30) Foreign Application Priority Data

Oct. 21, 1999 (JP) .......................... 11/300185
Feb. 4, 2000 (JP) ........................... 2000-27492

(51) Int. Cl.[7] .............................................. E21F 17/16
(52) U.S. Cl. ........................... 405/53; 405/43; 405/46; 405/55; 210/170
(58) Field of Search ........................ 405/36, 43, 46, 405/52, 53, 55, 129.85, 129.35; 210/170, 747

(56) References Cited

U.S. PATENT DOCUMENTS

| | | | | |
|---|---|---|---|---|
| 4,934,865 A | * | 6/1990 | Varkonyi et al. | 405/50 |
| 5,201,606 A | * | 4/1993 | Davis et al. | 405/55 |
| 5,246,308 A | * | 9/1993 | Brothers | 405/53 |
| 5,810,510 A | * | 9/1998 | Urriola | 210/170 |
| 5,823,711 A | * | 10/1998 | Herd et al. | 405/36 |

FOREIGN PATENT DOCUMENTS

| | | |
|---|---|---|
| JP | 63-44041 | 2/1988 |
| JP | 63-293233 | 11/1988 |
| JP | 2-157320 | 6/1990 |
| JP | 3-250118 | 11/1991 |
| JP | 6-20531 | 3/1994 |
| JP | 7-8434 | 2/1995 |
| JP | 8-60664 | 3/1996 |
| JP | 8-144285 | 6/1996 |
| JP | 9-41470 | 2/1997 |
| JP | 9-95999 | 4/1997 |
| JP | 9-296486 | 11/1997 |
| JP | 11-107353 | 4/1999 |
| JP | 2000-120150 | 4/2000 |
| JP | 2001239992 | * 2/2001 |

* cited by examiner

Primary Examiner—Jong-Suk (James) Lee
(74) Attorney, Agent, or Firm—Knobbe Martens Olson & Bear, LLP

(57) ABSTRACT

A rain-water storing permeation structure can be applied to facilities, such as architectures like buildings, roads, water channels, parks and play grounds, factory sites and domestic sites, as well as water storing blocks used for such a structure and a connecting member for connecting the water storing blocks to each other. The rain-water storing permeation structure of the present invention is provided with a water-shielding layer placed in a recessed section in the ground, a water-storing layer that is constituted by water-storing blocks made of a hard resin foam member having an inner space, and that is placed inside the water-shielding layer, and a lid layer.

8 Claims, 12 Drawing Sheets

WATER STORING BLOCK AND CONNECTING MEMBER FOR WATER STORING BLOCK AND RAIN WATER STORING/INFILTRATING STRUCTURE

The present application is the U.S. national phase under 35 U.S.C. §371 of International Application No. PCT/JP00/02359 filed Apr. 12, 2000.

FIELD OF THE INVENTION

The present invention relates to a rain-water storing permeation structure, and a water storing block and a water-storing block connecting member that are used for such a structure, and more specifically concerns a rain-water storing permeation structure which can be applied to facilities, such as architectures like buildings, roads, water channels, parks and play grounds, factory sites and domestic sites, as well as water storing blocks used for such a structure and a connecting member for connecting the water-storing blocks to each other.

BACKGROUND OF THE INVENTION

Conventionally, most of rain water permeated the soil, or formed ground water. Rain fall was held in the soil as a whole in various states, and exerted the following functions: It served as a water supply source required for growth of trees and other plants, adjusted the temperature of the earth surface through evaporation from the surface of the soil when it was hot, and also adjusted the amount of water of rivers.

However, in recent years, buildings, paved roads, etc., have increased due to rapid land developments and pavements of roads, resulting in less land where the soil is directly exposed to the surface in roads, play grounds and factory sites. For this reason, rain water is allowed to flow sewage systems and rivers through drainage channels, without penetrating the soil, thereby causing the following problems:

(1) Reduction and exhaustion in ground water, and the subsequent land subsidence.
(2) Occurrence of a heat island phenomenon due to inability of heat removal from the earth surface because of less water evaporation and the subsequent less heat absorption by vaporization.
(3) Concentration of rain water into sewage systems and rivers at the time of a heavy rain, and the subsequent occurrence of deluge and flood, or necessity of works for river control systems, and for expansion of sewage systems, etc. in an attempt to prevent such disasters.

In order to solve these problems, a method has been proposed in which: the ground is excavated to form a hole, a rain-water storing permeation structure is installed therein, and parks, roads, etc. are formed thereon, or buildings are built thereon. As described below, two types of such a rain-water storing permeation structure have been known:

(a) A structure based upon a concrete unit engineering method (Nikkei Construction, published on Mar. 13, 1998) in which a tank made of reinforced concrete is constructed as water-shielding material layers, and concrete blocks each of which has a void at a ratio of approximately 80% and also has each side set as large as 1.2 m are stacked and housed in this tank, and after a lid layer has been placed, a soil layer is further formed thereon so as to form a park, etc.
(b) A center-to-center* block engineering method (disclosed in a catalog of Hayashi Bussan K.K.) in which: a tank is formed by using a water-proof sheet as a water-shielding material layer, and in this tank, water-storing layers are formed by stacking and housing cage-shaped hollow blocks made from polypropylene, each of which has a trapezoidal pyramid shape measuring 360 mm×360 mm in upper surface, 270 mm×270 mm in bottom face, and 260 mm in height, with a void at a ratio of approximately 95%, and after a lid layer has been formed thereon, a soil layer is further placed thereon.

However, in the case of the concrete unit engineering method, since the weight of the concrete blocks is very high, its base portion needs to be formed by a high-strength material such as reinforced concrete, and a long construction period is required. Consequently, the construction costs become high as a whole.

Moreover, upon construction of the water-storing layers, a heavy machine is required in assembling the heavy concrete blocks. When such a heavy machine is used, a large working space is required, with the result that the land having a limited area cannot be used to an extent of 100%, thereby limiting the rain-water storing capability.

In the case of the center-to-center* block engineering method, the cage-shaped hollow blocks made of polypropylene (PP) do not have a sufficient compression strength; therefore, as is also described in the catalog, PP blocks can not be stacked with a depth of the water-storing layers exceeding 3 m. This limits the rain water storing capability per construction area. Moreover, PP is not sufficiently resistant to degradation due to microorganisms, etc., in the soil.

The objective of the present invention is to provide a rain-water storing permeation structure which is easily constructed without the need for a heavy machine, has a superior load-resistant property, and provides a sufficient depth and the subsequent great rain-water storing capacity, as well as water storing blocks used therein and a connecting member for connecting these water-storing blocks.

DISCLOSURE OF THE INVENTION

In order to achieve the above-mentioned objective, the rain-water storing permeation structure of the present invention features a construction which is provided with a water-shielding layer placed in a recessed section in the ground, a water-storing layer that is constituted by water-storing blocks made of a hard resin foam member having an inner space, and that is placed inside the water-shielding layer, and a lid layer.

The water-storing block made of a hard resin foam member having an inner space has a high compression strength and a superior load resistant property, and is light weight and easily manufactured at low costs. Therefore, it is possible to provide a deep construction of the water-storing layers, and since no heavy machine is required, it is possible to reduce the working space; thus, it becomes possible to provide a rain-water storing permeation structure having a high rain-water storing capacity per construction area. In particular, its superior load resistant property enables the upper surface to be used as roads, and the coverage of such a wide area makes it possible to store and utilize a large amount of rain water, and consequently to reduce damage from heavy rain fall.

The water-storing layer is formed by the water-storing blocks that are arranged, stacked and placed therein; thus, a number of small voids for storing rain water are formed. The percentage of void of the water-storing block is set to not more than 70%, and more preferably, in the range of 40 to 65%. The percentage less than 40% causes a reduction in the rain-water storing capacity, and the percentage exceeding 70% tends to cause an insufficient compression strength with respect to the load applied from above.

The upper surface of the rain-water storing permeation structure of the present invention can be utilized as sites for buildings, roads, play grounds, parks, gardens, etc. Therefore, with respect to the surface layer, layers, such as concrete bases, paved road surfaces, lawns, tartan tracks, soil, etc. are formed. The level of the upper surface of the lid layer is determined by taking into consideration the purpose of use, peripheral conditions, etc., and in general, it is set to virtually the same level as the peripheral soil layer, with the surface layer being included.

The water-shielding layer, which has a function to prevent stored rain water from leaking and flowing away, is made from a material having no water permeability. In general, a soil layer surrounds the rain-water storing permeation structure; however, not limited by this, structures such as concrete walls and concrete fences may surround the rain-water storing permeation structure.

The lid layer of the rain-water storing permeation structure of the present invention is preferably designed so as to include a water permeable material layer.

The lid layer has the following functions: prevention of soil from flowing into the inner voids of the water-storing block housed inside the water-storing layer; formation of a soil layer as the surface layer for effectively utilizing land; and prevention of stress from being concentrated on the water-storing block that tends to be adversely effected by a local load. On the top of the water-storing blocks, concrete floor plates, tiles, steel plates, natural stone plates, etc., are placed as the lid layer, and a soil layer is placed thereon as the surface layer, if necessary. A road may be formed as the surface layer.

In the case when the lid layer having no water permeability is placed as described above, a separate water-collecting facility such as a water-collecting ditch needs to be placed so as to introduce rain water into the rain-water storing permeation structure.

The application of a water-permeable material to the lid layer makes it possible to directly introduce rain water over the rain-water storing permeation structure into the rain-water storing permeation structure; thus, it is possible to greatly reduce water-collecting facilities to be attached to the rain-water storing permeation structure especially when it covers a wide area. In this arrangement, even in the event of a heavy rain, no soil forming the soil layer on the rain-water storing permeation structure is carried by water into a rain-water collecting facility and lost, which is advantageous. Moreover, when the road surface is heated, stored rain water is allowed to evaporate through the water-permeable lid, thereby cooling the road surface. Thus, it is possible to effectively reduce the heat island phenomenon.

It is preferable to place soil, water-permeable concrete floor plates, a sheet or blocks formed by binding particle-shaped or fiber rubber chips having a water-permeable property by using a binder, etc. on the water-permeable lid layer as the surface layer. In the case of a soil layer, it is more preferable to form a layer structure in which a coarse crushed stone layer, a ballast layer and a surface soil layer stacked from below with the higher layer having a finer grain size.

Moreover, the water-storing block of the present invention features a structure which has an external wall having a polygonal column shape with an inside void capable of storing water, is made of a hard resin foam member that can be buried in the soil, and also has an external wall face support section for receiving a pressure imposed on one face of the external wall having the polygonal column shape, and a diagonal support section connecting to the external wall face support section, for dispersing the pressure imposed on the face.

In the above-mentioned structure, even when it is buried deep in the soil and subjected to a strong soil pressure imposed sideways on the water-storing block, the external wall face support section, which receives the pressure imposed on one surface of the external wall having the polygonal column shape, first exerts a strong resistance, and upon receipt of a greater soil pressure, the diagonal support section connecting to the external wall face support section effectively disperses and weakens the soil pressure; thus, the side wall of the block becomes less susceptible to distortion and the resulting damage and destruction. Therefore, it is not necessary to take it into consideration to slant the pit walls so as to make it wider on the surface side in its cross-section and to assemble the blocks along its normal face; thus, it becomes possible to increase the water-storing capacity. Moreover, since the block is made of a hard resin foam member, it is light and no problem is raised in the strength even when a multi-stage layered structure is provided. It is also possible to easily construct without increasing construction costs. As a result, the advantages of the hard polystyrene foam blocks are sufficiently maintained, and it becomes possible to provide blocks capable of achieving a water-storing capability with a large capacity.

In the water-storing blocks of the present invention, the void of the water-storing block is preferably constituted by a void separated into a plurality of sections, and it is preferable that the void is surrounded by at least the diagonal support sections.

With this arrangement, more wall sections surrounding the void are formed so that a strong resistance is exerted against the soil pressure imposed from above, and so that the soil pressure, imposed sideways, is effectively dispersed by the wall sections surrounding the void surrounded by the diagonal support sections.

It is preferable to design the external wall of the water-storing block of the present invention to have an octagonal column shape formed by chamfering four corners of a virtually square column in an up and down direction, with each of the edge portions of the side having a circular arc shape protruding outward.

With this arrangement, the sides except the chamfered corners are made to contact each other so that a number of blocks are two-dimensionally placed in a stable manner, and since a void is formed between the corners, the percentage of void is increased and the amount of water storing is increased. Moreover, since the end portions of each side are formed into a circular arc shape protruding outward, it is possible to avoid concentration of stress at the end portions of each side, and consequently to increase the durability.

In the water-storing block of the present invention, it is preferable to form the corners of the inner walls of the void into an circular arc shape.

This arrangement makes it possible to disperse a stress on the corners at which concentration of stresses tends to occur, and consequently to ensure a higher durability.

The hard resin foam member of the water-storing block of the present invention is preferably made of styrene foam having an expansion ratio of at least not less than 20 times.

This arrangement makes it possible to achieve light weight and a reduction in the material costs, and an easy lamination process is achieved so that even in a pit deeply formed in the ground, a multi-stage laminated layers are formed, thereby making it possible to increase the water-storing capacity.

Moreover, the water-storing block connecting member of the present invention features that a plurality of claws, made of resin, for sticking the water-storing blocks respectively, are formed on the connecting member main body in a dispersed manner around the axis thereof, and a housing space for another member is formed between the adjacent claws in the circumferential direction around the axis. Here, the size of housing space for another member is set to a size in which a predetermined number of the claws are inserted in a manner aligned in the circumferential direction around the axis.

This arrangement provides the following functions [a] through [c]:

[a] For example, in an EUP engineering method (underground water-storing engineering method) in which a plurality of empty water-storing blocks are connected so as to form a civil engineering structure capable of drawing water, etc. stored inside the respective water-storing blocks, even in the case when the respective water-storing blocks are connected by the water-storing block connecting members, since the claws and the connecting member main body are made of resin, they do not cause rust, thereby making it possible to improve the durability.

[b] Moreover, as described above, the housing space for another member is formed between the adjacent claws in the circumferential direction of the axis, and the size of the housing space for another member is set to a size in which a predetermined number of the claws are inserted in a manner aligned in the circumferential direction around the axis. Therefore, when a plurality of water-storing block connecting members (hereinafter, "water-storing block connecting member" is occasionally referred to simply as "connecting member") are packaged, the respective connecting members 2 can be packaged in an overlapped manner in the following sequence, for example, as illustrated in FIGS. 14 to 16 (in FIG. 14, with respect to the connecting members 2, a connecting member on the uppermost side of the Figure in an up and down direction is referred to as the first connecting member, followed by the second connecting member, the third connecting member, the fourth connecting member, the fifth connecting member and the sixth connecting member in succession downward in the Figure).

① The respective claws 3 of the second connecting member 2 are placed adjacent to the respective claws 3 of the first connecting member 2 in the circumferential direction around the axis, when viewed in the axis direction of the connecting member main body 4 of the first connecting member 2; in this manner, the respective connecting member main bodies 4 are superposed on each other.

② The respective claws 3 of the third connecting member 2 are placed adjacent to the respective claws 3 of the second connecting member 2 in the circumferential direction around the axis, when viewed in the axis direction of the first (and second) connecting member 2; in this manner, the respective connecting member main bodies 4 are superposed on each other.

③ In this manner, one connecting member 2 is superposed on another connecting member 2 in succession.

④ When a predetermined number of claws 3 of the connecting member 2 have been inserted between the respective claws 3 of the first connecting member 2, when viewed from the axis direction of the first connecting member 2, etc., the above-mentioned processes ① through ③ are repeated based upon, for example, the connecting member 2 that was superposed lastly.

In other words, the respective claws 3 of the next connecting member 2 are placed adjacent to the respective claws 3 of the connecting member 2 in the circumferential direction around the axis, when viewed in the axis direction of the connecting member 2 that was last superposed; in this manner, the respective connecting member main bodies 4 are superposed on each other.

The claws 3 are normally formed with a narrowed top portion when viewed in the radial direction of the connecting member main body 4, and with this narrowed top shape, the respective claws 3 of the connecting member 2 to be superposed are allowed to enter a space between the claw 3 of the adjacent connecting member 2 in the superposing direction and the claw 3 adjacent to this connecting member 2 in the claw width direction; thus, it is possible to avoid an increase in the distance between the connecting member main bodies 4 of the two connecting members 2 due to interference between the claws 3 of the connecting members 2 adjacent to each other in the superposing direction.

⑤ By repeating the above-mentioned processes ① to ④, a plurality of connecting members 2 are superposed on one another.

[c] By superposing them in the manner as described in [b] above, the distance between the connecting member main bodies of the adjacent connecting members in the height direction of the claws is set to be shorter than the height dimension of the claws.

Therefore, it becomes possible to extend the service life of the water-storing block connecting member, and also to package a plurality of water-storing block connecting members in a compact manner.

In the present invention, the following arrangement is preferably made: the connecting member main body of the water-storing block connecting member is formed into an annular shape with the claws being placed on the peripheral edge of the connecting member main body; a plurality of assisting claws, made of resin, for sticking the water-storing blocks respectively, are placed on the inner circumferential edge of the connecting member main body, in a manner so as to have the same positional phase as the above-mentioned claws around the axis; the claw width of the assisting claw is set in such a manner that, when viewed from the axis direction, the assisting claw is positioned between a first hypothetical radial line extending from the axis to one edge end in the width direction of the claw and a second hypothetical radial line extending from the axis to the other edge end in the width direction of the claw; a housing space for another assisting member is formed between the adjacent assisting claws in the circumferential direction of the axis; and the size of the housing space for another assisting member is set to a size that allows a predetermined number of the assisting claws to enter in the circumferential direction of the axis in an aligned state.

In the above-mentioned arrangement, the claw width and the layout of the assisting claws are set as described above and the housing space for another assisting member is formed between the adjacent assisting claws in the circumferential direction of the axis; therefore, in the case when the connecting member main bodies of the respective connecting members are superposed in the sequence as described in [b], the assisting claws are placed adjacent to each other in the same manner as the claws so that it becomes possible to avoid problems such as incapability of the superposing process due to interference between the assisting claws.

Moreover, the assisting claws are placed on the inner circumferential edge of the annular connecting member main body in such a manner that, in the state where a force is applied so as to allow the claws and the assisting claws to stick the water-storing blocks made of resin, it is possible to prevent the center portion of the connecting member main body from deflecting toward the water-storing block, and also to prevent the claws from tilting outward due to this deflection and sticking the water-storing blocks in this state. Therefore, it becomes possible to further increase the connecting force.

Each of the claws and the assisting claws of the water-storing block connecting member of the present invention may be formed into a double-claw type so that, with the respective centers in the length direction of the claws and the assisting claws being located in between, the first claw portion on one side and the second claw portion on the other side are allowed to stick respective water-storing blocks adjacent to each other in the layer stacking direction.

With this arrangement, it is possible to connect a plurality of water-storing blocks in an abutting manner by using one connecting member, and also to connect the adjacent water-storing blocks in the layer stacking direction.

Therefore, it is possible to reduce the number of the connecting members per civil engineering structure, and also to reduce costs required for the construction work.

THE BEST MODE FOR CARRYING OUT THE INVENTION

Figure 1:
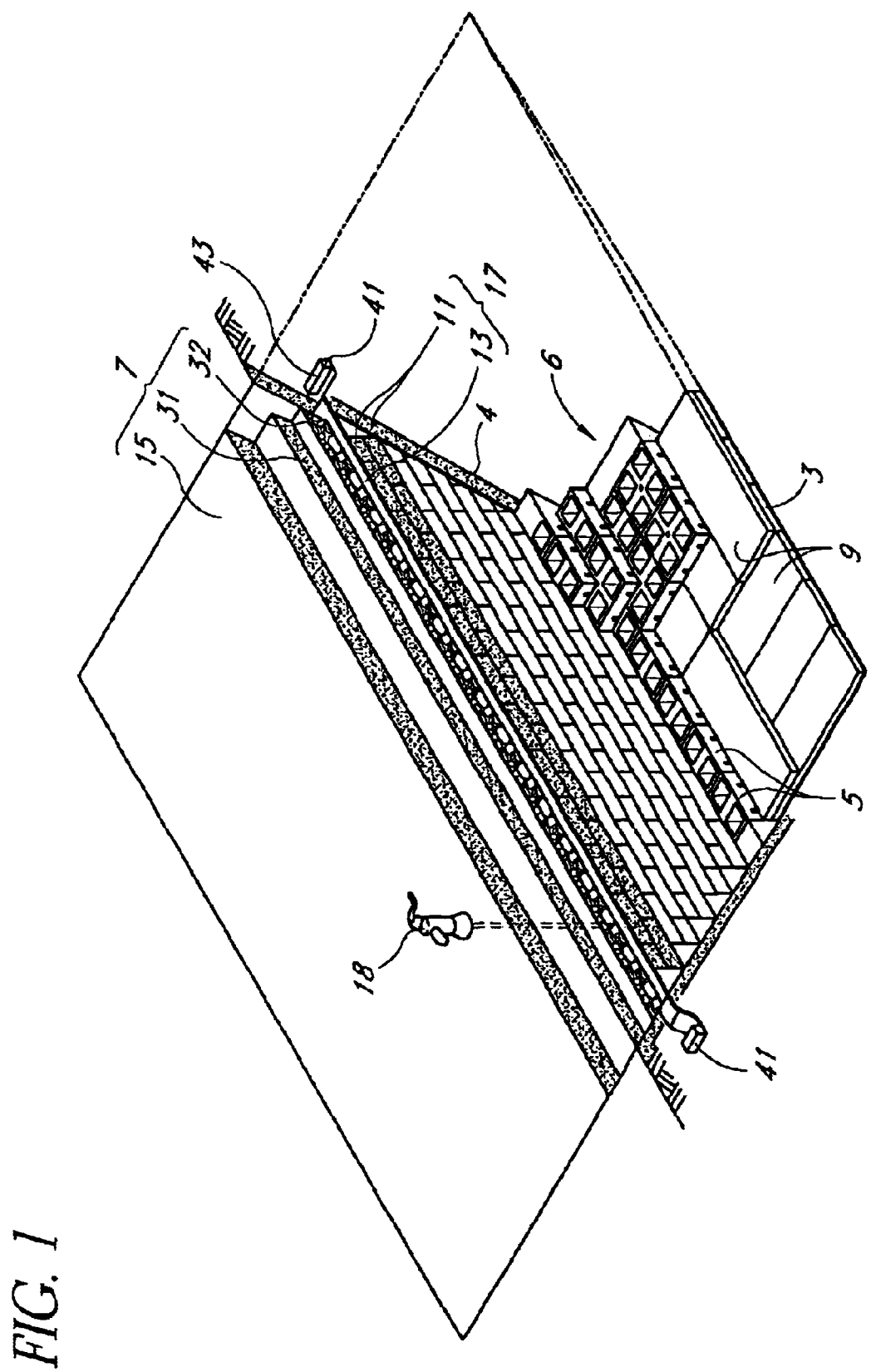
FIG. 1 is a perspective view that shows a cross-section of a structural example of a rain-water storing permeation structure of the present invention in a manner so as to explain a constructed state of water-storing blocks and water-permeable polystyrene foam boards.

With respect to the material for the water-storing block layers used in the present invention, a known hard resin foam member can be used without any particular limitation; and examples thereof include hard polyurethane foam, foamed polystyrene (polystyrene foam), etc. A method for forming these materials into a water-storing block is not particularly limited; however, a method in which the foaming resin material is loaded into a mold having a void with a predetermined shape and foamed is most preferably used.

In particular, the application of polystyrene foam is particularly preferable in that it is inexpensive and less susceptible to hydrolysis and deterioration due to microorganisms in the soil, and in that since polystyrene is a thermoplastic resin, it is reusable.

The polystyrene foam is manufactured through a known manufacturing method. More specifically, a method is exemplified in which polystyrene beads are impregnated with low-boiling-point hydrocarbon such as propane or butane to form a foaming resin material, and a predetermined amount of this foaming resin material is loaded into a mold with a void having a predetermined shape that is heated to a predetermined temperature so that the polystyrene is brought into a fluidizing state with a foaming agent evaporated, thereby forming a foamed material.

The density of the polystyrene foam, which is varied depending on the mold void and the amount of load of the resin, the amount of impregnated foaming agent to the polystyrene resin, etc., is properly adjusted depending on its purpose. In the water-storing block of the present invention, the density of the foamed material is preferably set in the range of 10 to 50 kg/m$^3$, and the density less than 10 kg/m$^3$ fails to provide a sufficient compression strength for the block, and in the case of a heavy block exceeding 50 kg/m$^3$, the weight becomes too great, resulting in degradation in the operability.

With respect to the water-permeable material layer of the rain-water storing permeation structure, a water-permeable polystyrene foam layer is preferably used, and the permeability is not particularly limited as long as rain water is allowed to penetrate therein. The water-permeable polystyrene may be provided as foamed beads bonded or fused with voids included therein, or as foamed polystyrene having a strip shape with a diameter of several mm to several tens mm, bonded or fused into a plate or a block. It is preferable to use a water-permeable sheet in combination with such a water-permeable polystyrene foam layer. With respect to the water-permeable sheet, a known sheet may be used, and more specifically, examples thereof include fiber materials such as polyester cloth or a composite material of a fiber material and a resin material.

With respect to the material constituting the water-shielding material layer in the rain-water storing permeation structure is not particularly limited, as long as it can maintain stored rain water without leakage or flow away. Examples thereof include resin, metal, concrete, etc., and a water-proof sheet is more preferably used. The water-storing block used in the rain-water storing permeation structure in the present invention has a light weight; therefore, with respect to the water-shielding layer housing the block, it is not necessary to use a material having a high strength such as concrete (at least one water-proof sheet is sufficient), and it is possible to avoid corners of the water-storing block from damaging the water-proof sheet. The application of a flexible water-proof sheet makes it possible to carry out a construction work in accordance with the shape of the soil layers in the pit, and also to shorten the construction period, resulting in effects of easy construction and low costs.

With respect to the arrangement and material of the water-proof sheet, not particularly limited, any material which is generally used as a water-proof sheet may be used. More specifically, a sheet having a thickness of approximately 4 mm, formed by nonwoven fabric of organic fibers impregnated and coated with an asphalt-based material, or a sheet having a thickness of approximately 0.5 mm to 5 mm, formed by combining a cured composition of a rubber material, such as chloroprene rubber, butyl rubber or ethylene propylene rubber (EPDM), with a woven cloth or a nonwoven fabric of natural fibers and synthetic fibers, if necessary, is preferably used. Besides the rubber material crosslinked through curing, a thermoplastic resin or a thermoplastic elastomer, which is solely formed into a sheet or combined with fibers to form a sheet, may also be used. In particular, a composite sheet formed by an organic nonwoven fabric and an asphalt-based material has a superior expanding property, and is easily affixed to a recessed shape of the pit in the ground, and inexpensive; therefore, this material is preferably used.

Figure 4:
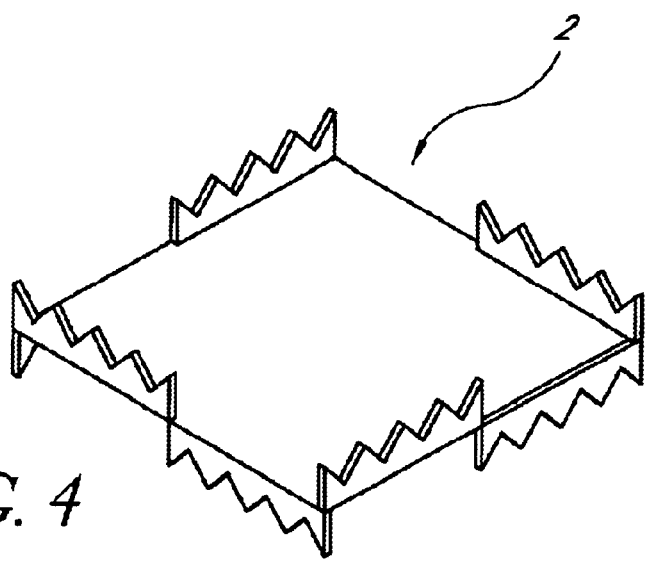
FIG. 4 is a perspective view that shows a water-storing block connecting member for securing water-storing blocks together with each other in the rain-water storing permeation structure of FIG. 1.

Referring to Figures, the following description will discuss embodiments of the present invention. In the following examples, polystyrene foam having a density of 25 kg/cm$^3$ is used as the hard resin foam member. The water-storing block 5 having a shape shown in FIG. 4 is used as the water-storing block. With respect to the water-permeable polystyrene foam material, a water-permeable polystyrene foam board (trade name: Tummy Block, made by Tamai Kankyo System K.K.), which was obtained by forming strip polystyrene foam into a board shape having a thickness of 250 mm, was used.

Figure 2:
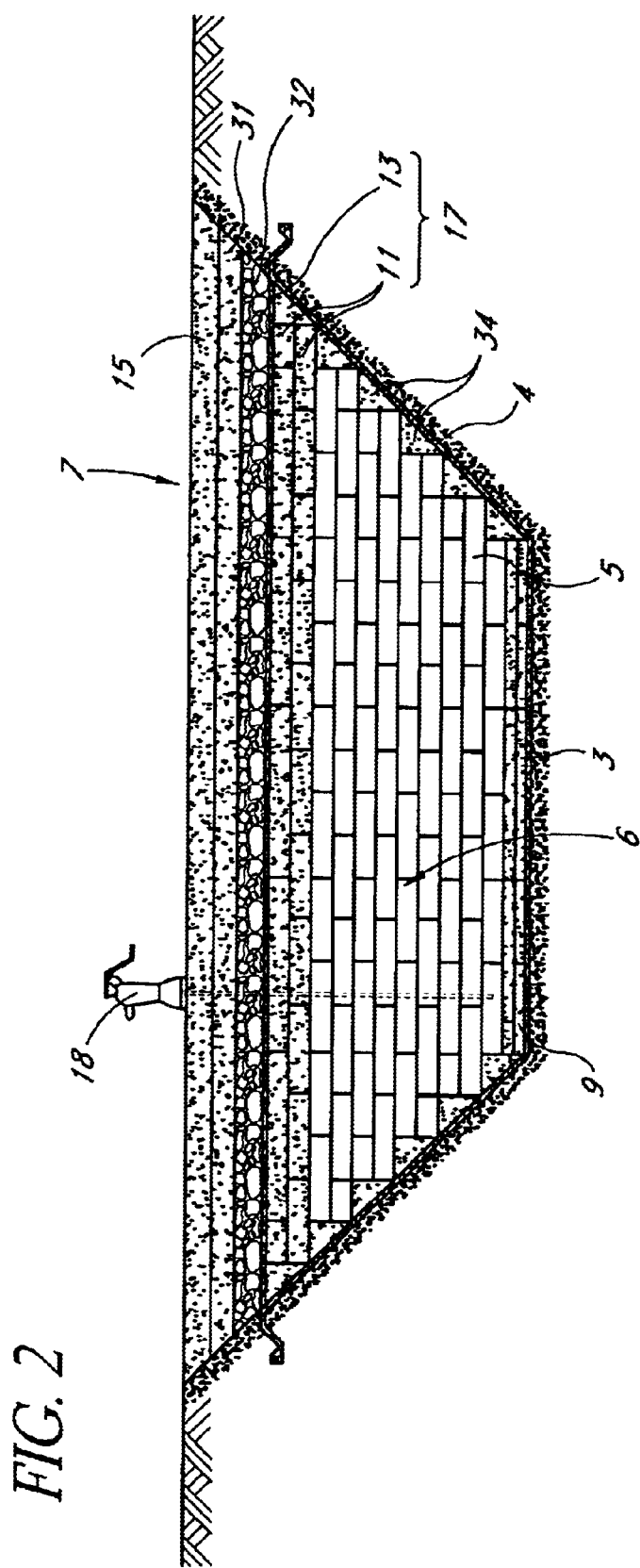
FIG. 2 is a cross-sectional view of the rain-water storing permeation structure shown in FIG. 1.

FIG. 1 is a perspective view of a vertical cross-section that shows an arrangement and a laminated state of water-storing blocks and water-permeable polystyrene foam boards. FIG. 2 shows a cross-sectional construction of the rain-water storing permeation structure of FIG. 1. The rain-water storing permeation structure, exemplified by FIGS. 1 and 2, has a bottom surface having a length of 6 m and a width of 6 m, and a depth of 4 m from the ground surface, and the side walls of the water-storing layer are widened upward with an angle of 45° from the bottom surface; the upper surface has a square shape, each side having 12 m. The rain-water storing permeation structure 1 has a trapezoidal reversed pyramid shape, and is constituted by the following layers placed along the respective pit faces in the ground with the side faces having a tilt angle of 45°: a water-shielding sheet layer 3 using a composite sheet having a thickness of 4 mm made of an organic fiber nonwoven fabric and an asphalt-based material (trade name: Custom NT, made by Nisshin Tokushu Kensetsu K.K.) as a water-shielding material layer 3; a water-permeable polystyrene foam board layer 9 formed as the lowermost layer; a water-storing layer 6 formed by stacking water-storing blocks 5 having inner spaces; a layer 11 having two stages of water-permeable polystyrene foam board layers; and a lid layer 17 made of a water-permeable sheet 13.

A pump 18 is installed in the rain-water storing permeation structure shown in FIGS. 1 and 2 so as-to draw rain-water stored therein. In the case when the rain-water storing permeation structure is formed into a mound-shape and placed higher than the peripheral portion like a road, instead of a pump, a water-releasing means such as valve may be used. Moreover, as illustrated in FIGS. 1 and 2, a sand layer 4 is preferably placed on the outside of the water-shielding sheet layer 3.

Figure 3:
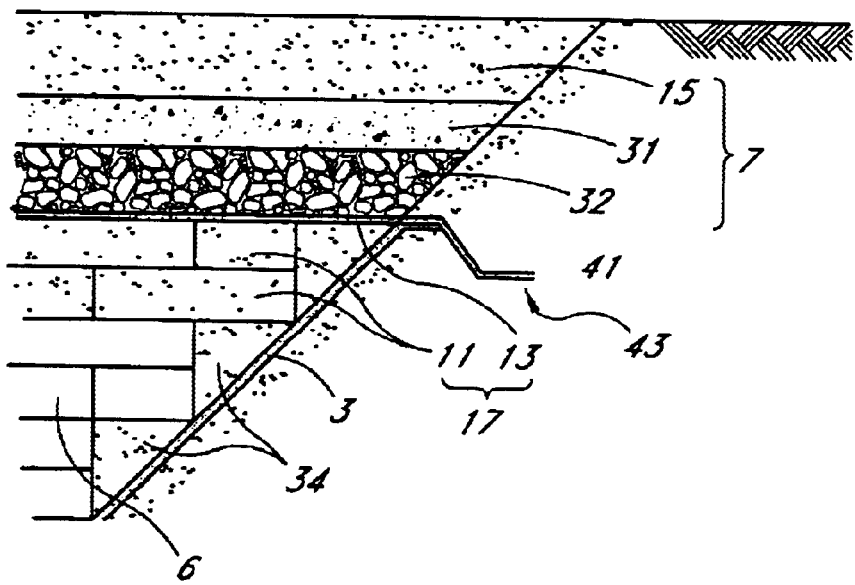
FIG. 3 is a partial enlarged cross-sectional view of an upper end portion of the rain-water storing permeation structure shown in FIG. 1.

FIG. 3 shows the structure of the upper end portion of the rain-water storing permeation structure in an enlarged manner. The rain-water storing permeation structure 1 is shielded by the water-shielding sheet 3 from the peripheral soil of the pit, and provided with the water-storing layer 6 formed by the polystyrene foam blocks 20 (FIG. 5) serving as the arranged and stacked water-storing blocks 5, and the lid layer 17 placed thereon that is formed by the water-permeable sheet layer 13 and the water-permeable polystyrene foam board layer 11. Moreover, on the lid layer 17, a surface layer 7, constituted by a crushed stone layer 32, a gravel layer 31 and a soil layer 15, is formed. Each of spaces having a triangular shape formed by the peripheral soil faces of the pit and the rectangular water-storing blocks is filled with a water-permeable polystyrene foam board cut into a proper shape as a filling member 34.

The water-shielding sheet 3 is affixed to the level of the upper end of the water-storing layer 6 formed by the water-permeable polystyrene foam boards 11 and the water-storing blocks 5, and secured to the peripheral ground portion. The securing of the water-shielding sheet 3 is carried out as follows: First, the peripheral ground is widely dug up in the vicinity of the securing section, and the water-shielding sheet 3 is placed. Then, the end portions are fixed by, for example, stakes 41 and anchor pins 43, and the predetermined water-storing blocks 5 and the water-permeable polystyrene foam boards 11 are arranged thereon, and the water-permeable sheet 13 is further placed thereon and properly secured.

Upon arranging and stacking the water-storing blocks 5, it is preferable to use connecting members 2, and FIG. 4 shows an example of such a connecting member. The connecting member 2 has such functions that it prevents the water-storing blocks from moving laterally, and also ensures the load-resistant strength of the water-storing layer. The connecting member 2, shown in FIG. 4, is formed by machining an end portion of a steel plate having a proper size into a saw-teeth shape and bending this in the vertical direction, and this is placed between the foamed materials of the stacked upper and lower polystyrene foam blocks with the saw-teeth end portion cutting therein; thus, it is allowed to exert a predetermined function. The shape of the connecting member 2 is not particularly limited as long as it exerts the above-mentioned function.

Figure 5:
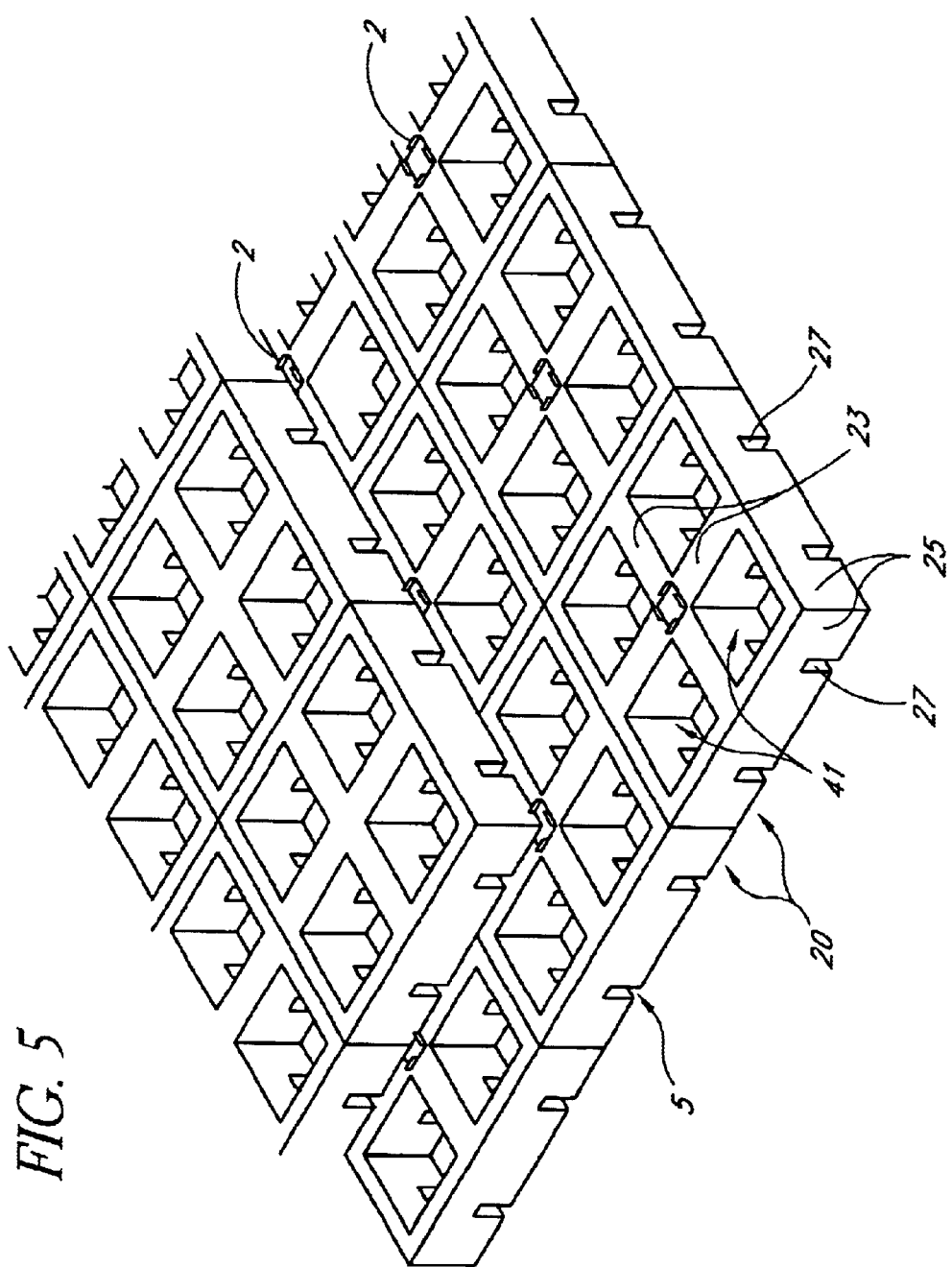
FIG. 5 is a perspective view that shows an example of use of the water-storing block connecting member used in arranging and laminating the water-storing blocks of FIG. 4.

FIG. 5 shows an example in which the polystyrene foam blocks 20, used in FIGS. 1 and 2, are arranged and stacked by using the connecting members shown in FIG. 4. This polystyrene foam block 20 has a size of 1000 mm in length, 1000 mm in width and 250 mm in height, and is provided with four inner spaces 21, each penetrating in an up and down direction and having a size of 350 mm in length and 350 mm in width. When viewed from above, this has a lattice structure. The foamed material serving as a partition 23 of the spaces has a thickness of 150 mm, and the foamed material forming the peripheral walls 45 has a thickness of 75 mm. When these are arranged and stacked without gaps, the inner spaces are arranged with intervals of 150 mm. The foamed material, which forms the partition 23 of the spaces and the peripheral walls 25, is provided with a slit 27 having a width of 25 mm and a height of approximately 100 mm so that rain water is allowed to freely flow between the right and left inner spaces.

The shape of the polystyrene foam blocks is not limited by the above-mentioned shape; and any shapes, such as a column shape and a polygonal pillar shape, may be used as long as the shape is not broken by a load imposed from above. Moreover, it is not necessary for all the water-storing blocks to have the same shape, and blocks having different shapes may be freely combined. It is not necessary for all the water-storing blocks used for the water-storing layer to have the inner spaces, and hard resin foam members without spaces may be interpolated upon arranging and stacking the blocks. Here, with respect to the arranged and stacked water-storing blocks, they are not necessarily arranged and stacked without gaps between them, as long as they withstand a load applied from above. Moreover, with respect to the spaces for storing water, in addition to the inner spaces provided in the blocks themselves of the water-storing blocks, those resulting from the arranging and stacking state of the water-storing blocks may be included.

The inner space of the polystyrene foam block 20 serving as the water-storing block 5 of FIG. 5 has a shape that is opened in the vertical direction; however, it may have partitions in the horizontal direction. In this case, however, since the partitions in the horizontal direction is less contributive to the strength against a load applied from above, resulting in a reduction in the amount of water storing. It is preferable that the inner space has a shape that is opened in the vertical direction.

In the construction example shown in FIG. 5, the water-storing block 5 is placed with the connecting member 2 sticking the foamed member at the center of the partition 23 of the lattice-shaped water-storing block located below, and the connecting member sticks the respective corners of the peripheral walls 25 of four water-storing blocks 5 located as its upper layer so as to secure them; thus, the arrangement is made such that the center of the water-storing block of the lower layer is positioned at the connecting point of the four corners of the water-storing blocks of the upper layer. This arrangement preferably prevents the occurrence of a partial descent even when a partial load is imposed on the top of the rain-water storing permeation structure.

Figure 6:
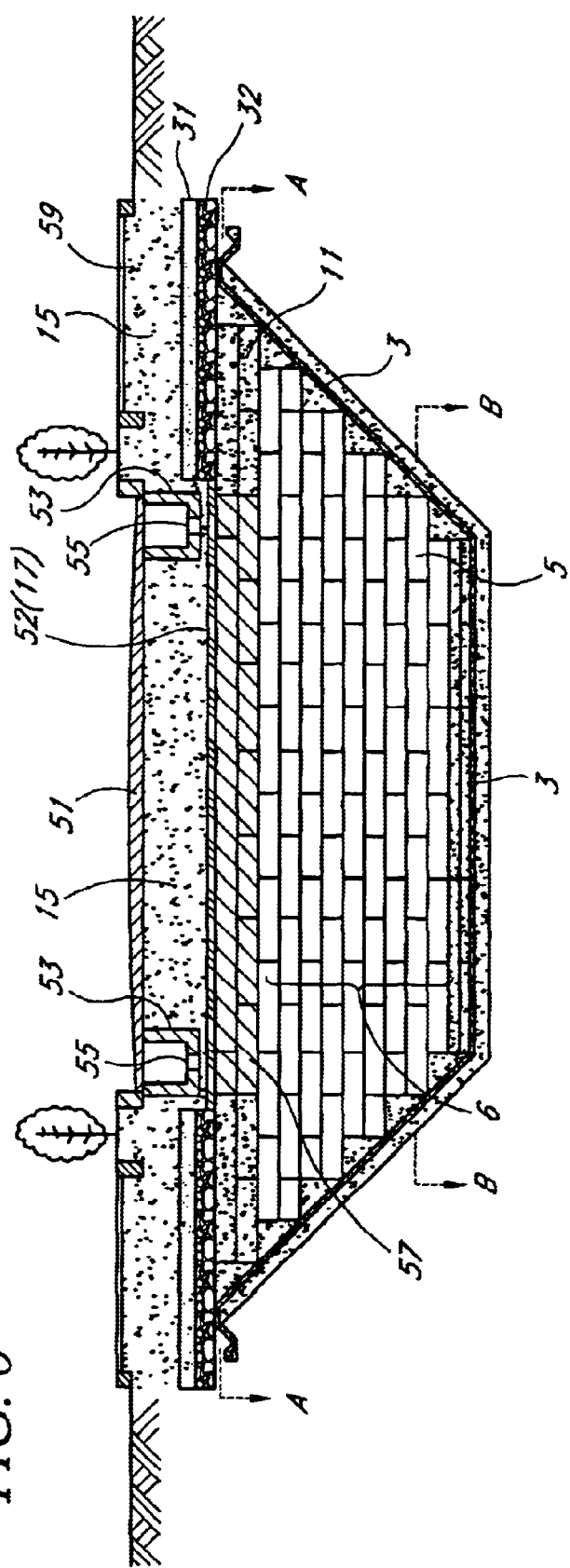
FIG. 6 is a cross-sectional view that shows a case in which the rain-water storing permeation structure of FIG. 1 is formed below a road.

FIG. 6 shows an example in which a rain-water storing permeation layer is placed beneath a paved road.

The paved road is constructed as follows: A paved road face 51 is placed, below this layer are placed a soil layer 15 and a concrete floor plate 52 serving as the lid layer 17, below this is placed a water-storing layer 6 formed by arranging the water-storing blocks 5, and below this is placed a water-proof sheet layer 3. Here, in this example, in order to receive the load of the concrete floor plate 52 uniformly in a dispersed manner, a normal polystyrene foam block layer 57 is formed as the lower layer of the concrete floor plate 52. On the road side, a water-collecting funnel 53 is installed and a water-passage hole 55 is formed in the water-collecting funnel 53 so that rain water is allowed to permeate the water storing layer 6 through the water-passage hole 55.

In recent years, a water-permeable paving method has been developed, and in the case of a water-permeable paved road face, it is possible to use a water-permeable lid, exemplified by FIG. 1, may be used, without installing the water-collecting funnel 53 with the water-passage hole 55.

The rain-water storing permeation layer shown in FIG. 6, placed below a paved road, has the same shape as exemplified in FIGS. 1 and 2, and the paved traffic road has a width of 7000 mm. The rain-water storing permeation layer may be continuously formed in the length direction of the road face, or storing layers having a structure exemplified by FIG. 6 may be intermittently formed.

On both sides of the paved traffic road are formed bushes and a side walk, and a water-permeable pavement layer 59 is formed. In the same manner as the example shown in FIG. 2, the soil layer 15, the gravel layer 31 and crushed stone layer 32 are formed from the top, and the water-permeable sheet layer and the water-permeable polystyrene foam board layer 11 are placed as a lid layer so that both rain water on the traffic road and rain water on the side walk are directed to the water-storing layer 6 and stored.

Figure 7:
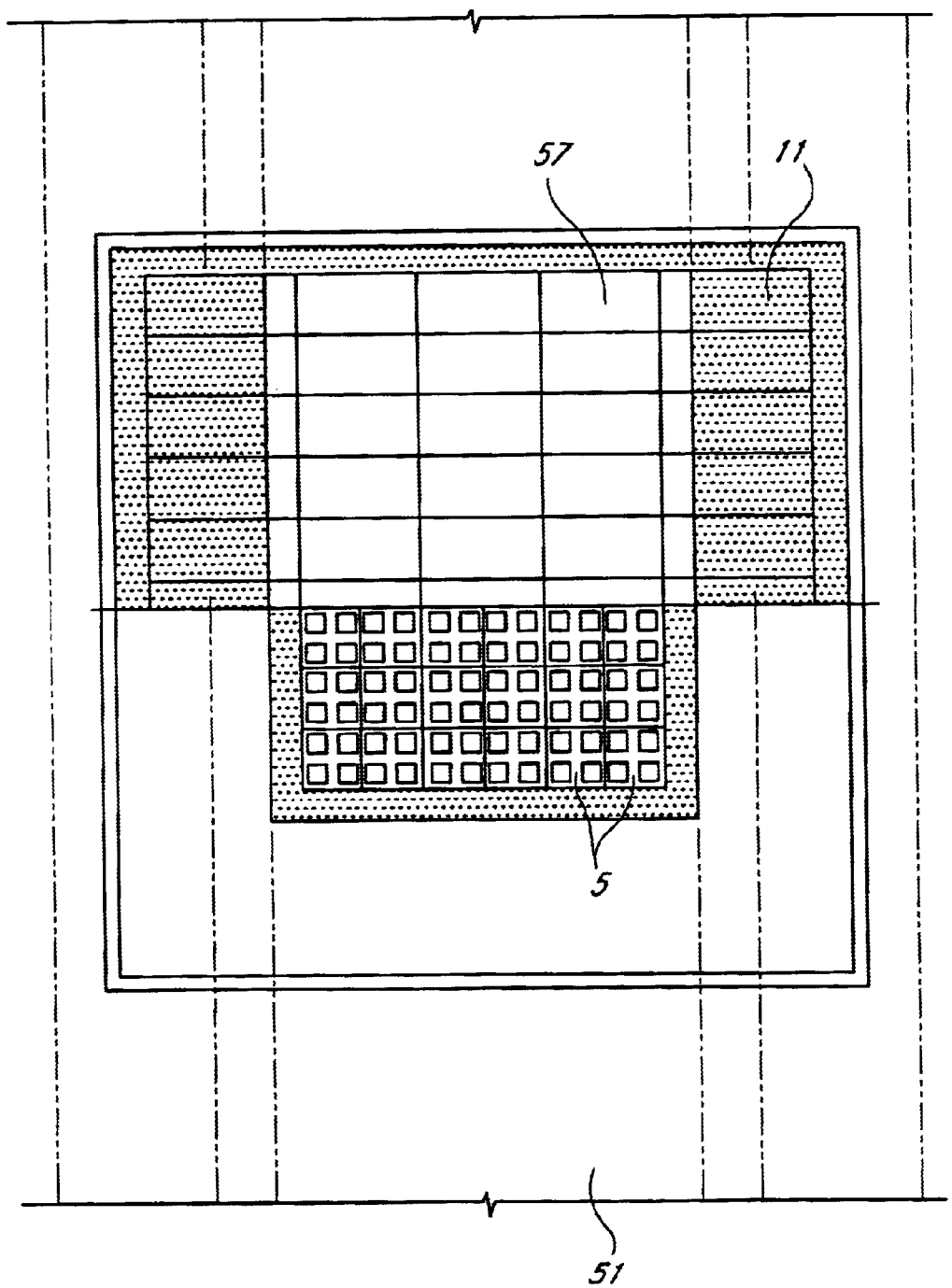
FIG. 7 is a drawing that shows an example of a horizontal cross-sectional structure of the rain-water storing permeation structure formed below a road.

Here, FIG. 7 shows a structure of the cross-sections in the horizontal direction taken along A—A and B—B of the rain-water storing permeation structure of FIG. 6.

The rain water stored in the rain-water storing permeation structure may be used as fire-extinguishing water, emergency drinking water after purification by a water-purifying device, and sprinkler-use water for plants.

Figure 8A:
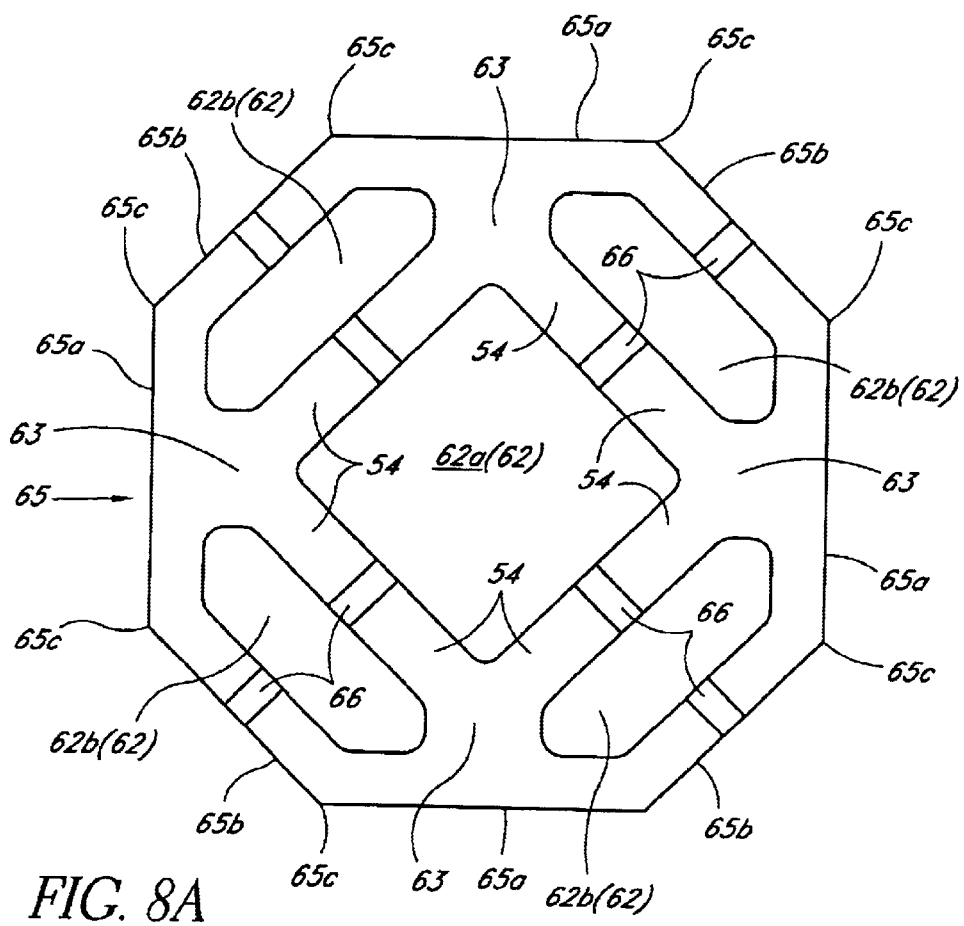
FIG. 8(a) is a plan view that shows a modified example of the water-storing block.
Figure 8B:
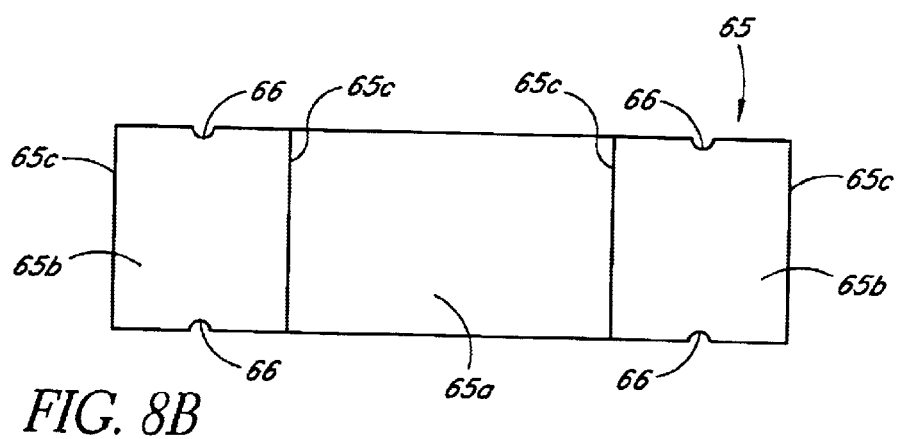
FIG. 8(b) is a front view thereof.
Figure 9:
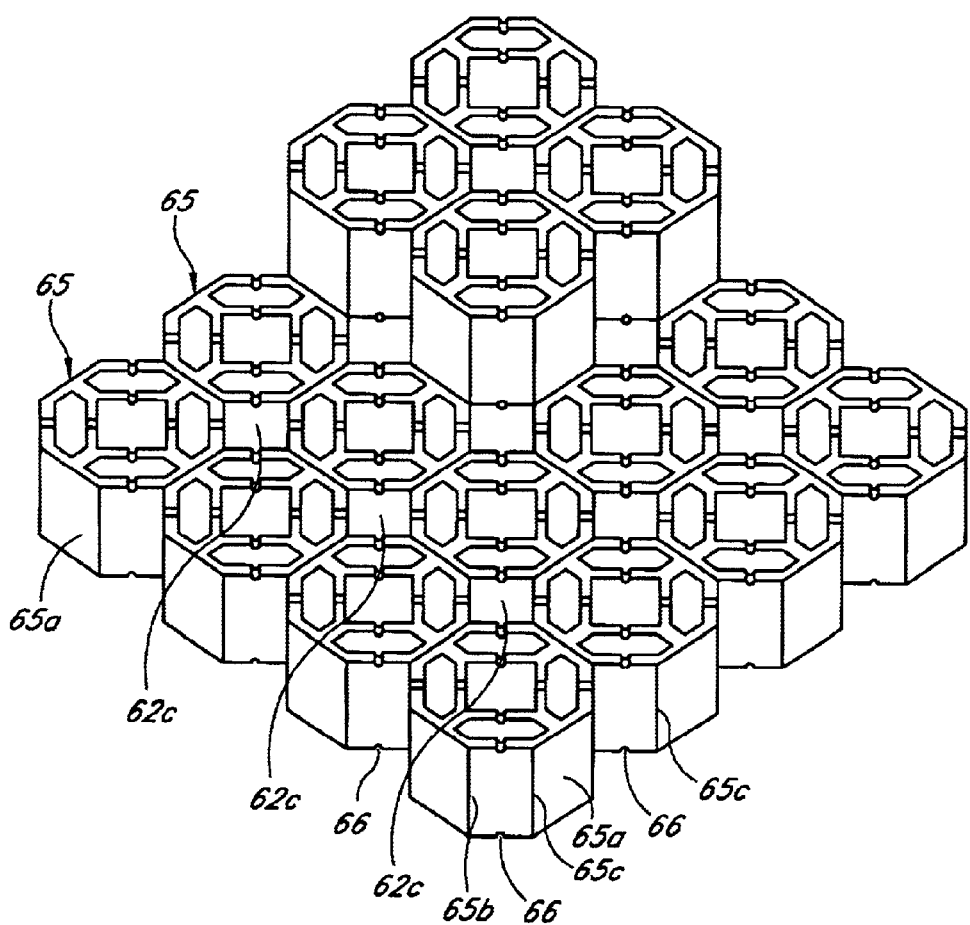
FIG. 9 is a partial perspective view showing an example in which the water-storing blocks of FIG. 8 are arranged.

ANOTHER PREFERRED MODE (1) The water-storing block used in the present invention may have an arrangement shown in FIG. 8. FIG. 8(a) shows a plan-view construction of the water-storing block, and FIG. 8(b) shows a front-view construction. FIG. 9 shows an example in which the water-storing blocks are partially stacked two-dimensionally. The water-storing block 65 is made of foamed styrol, which is one example of the hard resin foam member, and has an octagonal column shape formed by a virtually square column with four corners chamfered in an up and down direction; thus, its outer wall is constituted by four wider outer wall faces 65a and slightly narrower corner faces 65b connecting these. Each side 65c at which each outer wall face 65a and each corner face 65b intersect each other is preferably formed into an circular arc shape protruding outward, without having a sharp sticking shape. Thus, it is possible to avoid concentration of stresses at this portion caused by externally applied forces. Although not shown in the Figure, in the case when the water-storing blocks 65 are stacked in a manner as partially shown in FIG. 9, the connecting members, as shown in FIG. 4, are used to secure the water-storing blocks 65 so as not to be easily offset. Here, with respect to the stacking method of the water-storing blocks 65, in FIG. 9, the upper and lower water-storing blocks are stacked without offsetting them; however, they may be stacked in an offset manner in a diagonal direction so as to superpose the void 62b and the void 62c of the upper and lower water-storing blocks and allow them to communicate with each other.

Inside the outer wall constituting the water-storing block 65, a plurality of voids 62 are formed in a separate manner so as to store water. These voids 62 is constituted by a first void 62a in the center having a comparatively large and virtually square column shape, and four second voids 62b, each of which is formed along each side of the first void 62a, and located between each side and each corner face 65b with a narrow width along each side of the first void 62a and each corner face 65b. Here, a wall portion surrounding the first and second voids 62a and 62b exerts a reinforcing effect against an externally applied force imposed on the water-storing block 65. In other words, the wall portion, which extends from the virtually center of the outer wall face 65a inward in a direction virtually orthogonal to the outer wall face 65a and which is sandwiched between the adjacent second voids 62b, forms an outer wall face supporting portion 63, and a wall portion, which starts from the outer wall face supporting portion 63, and is surrounded by the second void 62b and the first void 62a, forms a diagonal supporting portion 64; thus, in the case when an external force is exerted on the outer wall face 65a, the external force is supported by the outer wall face supporting portion 63 so that the outer wall face 65a is not easily distorted. Even if a greater external force is exerted on the outer wall face 65a, the external force is supported by the outer wall face supporting portion 63, and the external force is also divided into two directions effectively by the diagonal supporting portion 64 connecting to the outer wall face supporting portion 63; thus, even in such a case, the outer wall face 65a is not easily distorted, and allowed to exert strong resistance.

Therefore, the water-storing vessel constituted by a plurality of such water-storing blocks 65 is less susceptible to damage and destruction, and allowed to maintain a great water-storing capability. Additionally, in any of the voids 62a and 62b, each of the inner wall corner portions is formed into a concave circular arc shape so as to avoid forming a sharp edge portion on which stresses tend to concentrate.

Moreover, in the case when a plurality of water-storing blocks 65 are two-dimensionally arranged, a void 62c surrounded by the water-storing blocks 65 themselves is formed inside thereof. In other words, the void 62c, surrounded by the corner faces 65b of the water-storing blocks 65, is formed so that it is possible to increase the percentage of void, and also to increase the amount of water storing.

A passage hole 66 having a semicircular shape in its cross-section, which allows the voids 62 to communicate with each other, is formed in each of the upper center portion and the bottom portion of each corner face 65b and on each wall portion on an extended line therefrom of the water-storing block 65; thus, it is possible to avoid storing water only in specific voids, and consequently to allow the voids 62 to have the same water level. In the case when the water-storing blocks 65 are stacked, as illustrated in FIG. 9, the passage holes 66, each having a virtually semicircular shape, are formed into a tube shape having a virtually circular shape in its cross-section by the water-storing blocks 65 stacked in an up and down direction. Here, the passage hole 66 may be formed into another shape, for example, a slit shape, so that when the water-storing blocks 65 are stacked vertically, the holes 66 are formed into a passage hole having an elongated shape, or may be formed into an elliptical shape; however, when they are arranged to form a into a tube shape having virtually circular shape in its cross-section as in the case of the present embodiment, it becomes possible to increase resistance against an external force and consequently to provide a superior strength, and it is also possible to preferably avoid concentration of stresses securely on the inner circumferential faces. Moreover, FIGS. 8 and 9 have exemplified a case in which one passage hole is formed in each of the virtually upper center portion and the bottom portion of each corner face 65b; however, the number and formation position thereof are not particularly limited by this example; and a plurality of holes may be formed, and it may be formed in a position other than the virtually center position of each corner face 65b.

(2) In order to increase the percentage of void of the water-storing blocks, another arrangement may be proposed in which a notched section is formed in each corner portion constituting the outer wall. In the case when a water-storing layer is formed by aligning side by side or stacking a plurality of water-storing blocks, this arrangement makes it possible to form a void surrounded by the notched sections formed in the respective corner portions; thus the percentage of void is increased and the amount of water storing is also increased.

Figure 10:
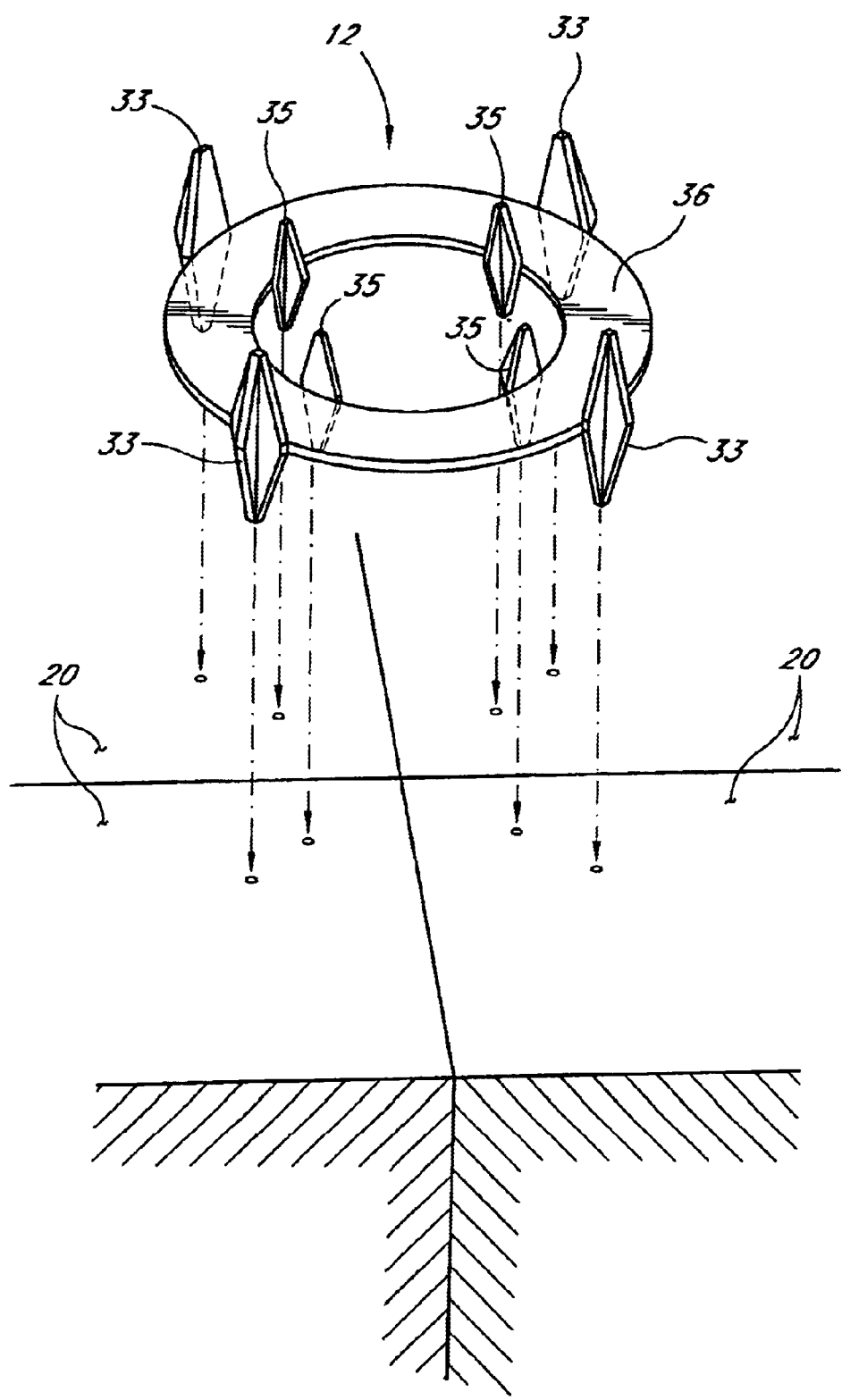
FIG. 10 is a perspective view that shows a modified example of a water-storing block connecting member for securing the water-storing blocks together with each other.
Figure 11:
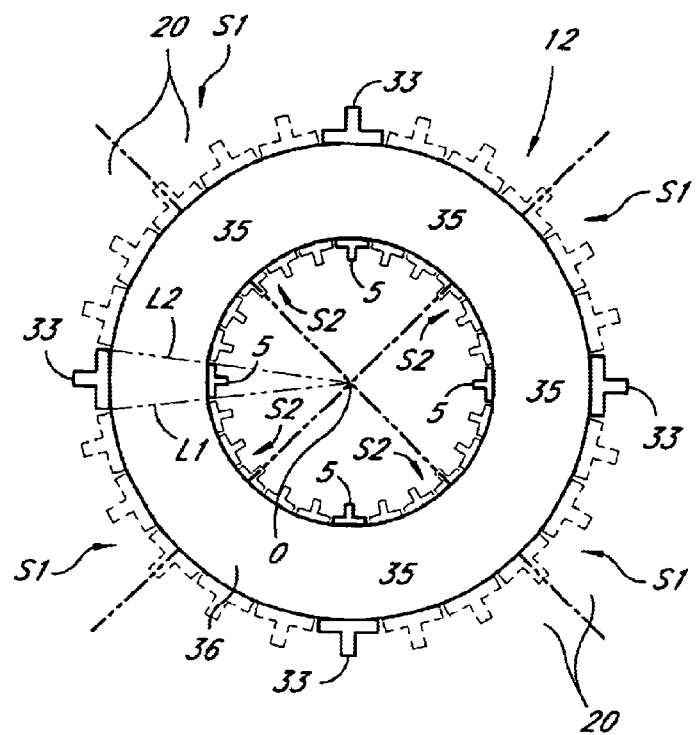
FIG. 11 is a plan view that shows the water-storing block connecting member of FIG. 10.
Figure 12:
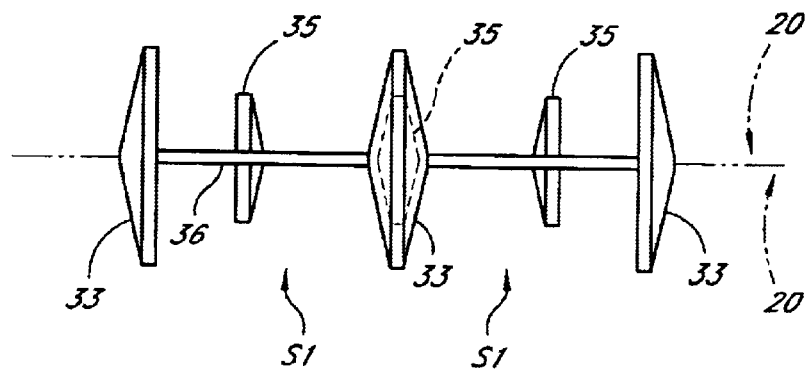
FIG. 12 is a front view of the water-storing block connecting member of FIG. 10.

(3) FIGS. 10 to 12 show a modified example of the water-storing block connecting member.

An explanation will be given of an example in which the water-storing block connecting member 12 is applied to an EUP engineering method. The EUP engineering method refers to an engineering method wherein among a plurality of empty foamed styrol blocks 20, circumferential portions of the adjacent foamed styrol blocks 20 in the lateral direction are face-to-face connected through a connecting member 12, and the adjacent foamed styrol blocks 20 in an up and down direction (in the stacking direction) are also connected to each other through a connecting member 12 so as to form a civil engineering structure; thus, rain water, etc., is stored inside the foamed styrol blocks 20 so as to be drawn later.

The connecting member 12 is made of high-impact polystyrene, and molded, and four claws 33 that respectively stick a plurality of adjacent foamed styrol blocks 20 in the lateral direction and in the up and down direction (in the stacking direction) are placed on the peripheral edge of a connecting member main body 4 having a virtually disc doughnut shape in a uniformly dispersed manner around the axis of the connecting member main body 4, and four assisting claws 35 shorter than the claws 33 are placed on the inner circumferential edge of the connecting member main body 4 in a manner so as to have the same positional phase as the claws 33 around the axis. Here, an another-member housing space S2 is formed between the adjacent claws 33 in the circumferential direction of the axis, and assisting another-member housing space S2 is formed between the adjacent assisting claws 35 in the circumferential direction of the axis. In FIG. 12, O represents the axis of the connecting member main body 36.

Each of the claws 33 and the assisting claws 35 is formed into a double claw shape having a T-letter format in its cross-section with narrowed tops so that, with the respective centers in the length direction of the claw 33 and the assisting claw 35 being located in between, the first claw portion on one side and the second claw portion on the other side are allowed to stick respective foamed styrol blocks 20 adjacent to each other in the stacking direction (the foamed styrol blocks 20 are sufficiently soft so as to be stuck by the claws 33 and the assisting claws 35).

The size of the another-member housing space S1 is set to a size allowing a predetermined number of the claws 33 to be inserted therein side by side in the circumferential direction of the axis, and the size of the assisting another-member housing space S2 is set to a size allowing a predetermined number of the assisting claws 35 to be inserted therein side by side in the circumferential direction of the axis.

Here, the claw width of the assisting claw 35 is set in such a manner that, when viewed from the axis direction, the assisting claw 35 is positioned between a hypothetical radial line L1 extending from the axis O to one edge end in the width direction of the claw 33 and a hypothetical radial line L2 extending from the axis O to the other edge end in the width direction of the claw 33.

In the connecting member 12 having the above-mentioned structure, the claws 33 and the assisting claws 35 are allowed to stick into the foamed styrol blocks 20 when the worker stamps thereon with the foot or makes other like movements, so that the adjacent foamed styrol blocks 20 are connected to each other.

Figure 13:
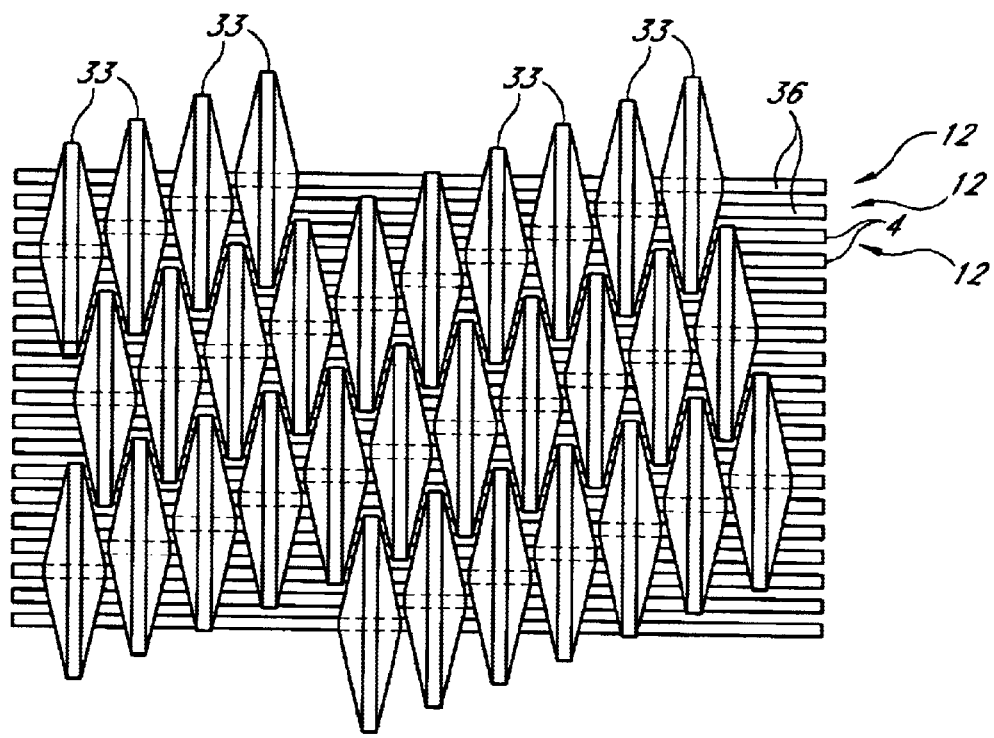
FIG. 13 is a development elevation that shows a state in which the water-storing block connecting members of FIG. 10 are stacked for packaging.

Next, an explanation will be given of a means for packaging a number of the connecting members 12 having the above-mentioned structure (see FIG. 13, in FIG. 13, with respect to the connecting members 12, a connecting member on the uppermost side of the Figure in an up and down direction is referred to as the first connecting member, followed by the second connecting member, the third connecting member, the fourth connecting member, the fifth connecting member and the sixth connecting member in succession downward in the Figure).

①  When viewed in the axis direction of the connecting member main body 36 of the first connecting member 2, the respective claws 33 of the second connecting member 12 are placed adjacent to the respective claws 33 of the first connecting member 12 in the circumferential direction around the axis, and the respective assisting claws 35 of the second connecting member 12 are placed adjacent to the respective assisting claws 35 of the first connecting member 12 in the circumferential direction around the axis; in this manner, the respective connecting member main bodies 36 are superposed on each other.

② When viewed in the axis direction of the first (and second) connecting member 12, the respective claws 33 of the third connecting member 12 are placed adjacent to the respective claws 33 of the second connecting member 12 in the circumferential direction around the axis, and the respective assisting claws 35 of the third connecting member 12 are placed adjacent to the respective claws 35 of the second connecting member 12 in the circumferential direction around the axis; in this manner, the respective connecting member main bodies 36 are superposed on each other.

③ As described above, one connecting member 12 is superposed on another connecting member 12 in succession.

④ If, when viewed from the axis direction of the first connecting member 2, etc., a predetermined number of claws 33 of the connecting member 2 have been inserted between the respective claws 33 of the first connecting member 12 and a predetermined number of assisting claws 35 of the connecting member 12 have been inserted between the respective assisting claws 35 of the first connecting member 12, the above-mentioned processes ① through ③ are repeated based upon, for example, the connecting member 12 that was superposed lastly.

In other words, when viewed in the axis direction of the connecting member 12 that was last superposed, the respective claws 33 of the next connecting member 12 are placed adjacent to the respective claws 33 of the connecting member 12 in the circumferential direction around the axis, and the respective assisting claws 35 of the next connecting member 12 are placed adjacent to the respective assisting claws 35 of the connecting member 12 that was last superimposed in the circumferential direction around the axis; in this manner, the respective connecting member main bodies 36 are superposed on each other.

⑤ A plurality of the connecting members 12 are superposed on one after another by repeating the above-mentioned processes ① through ④.

Figure 14:
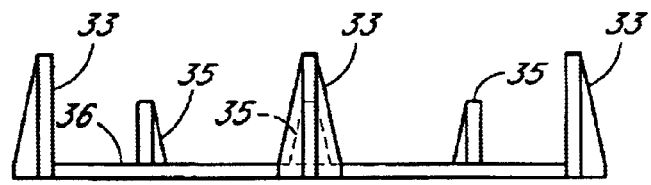
FIG. 14 is a front view that shows another modified example of the water-storing block connecting member.

(4) FIG. 14 shows still another modified example of the connecting member. This connecting member is also applied to one-side claw type wherein the claws 33 and the assisting claws 35 are formed on one plate face of the connecting member main body 36.

Figure 15:
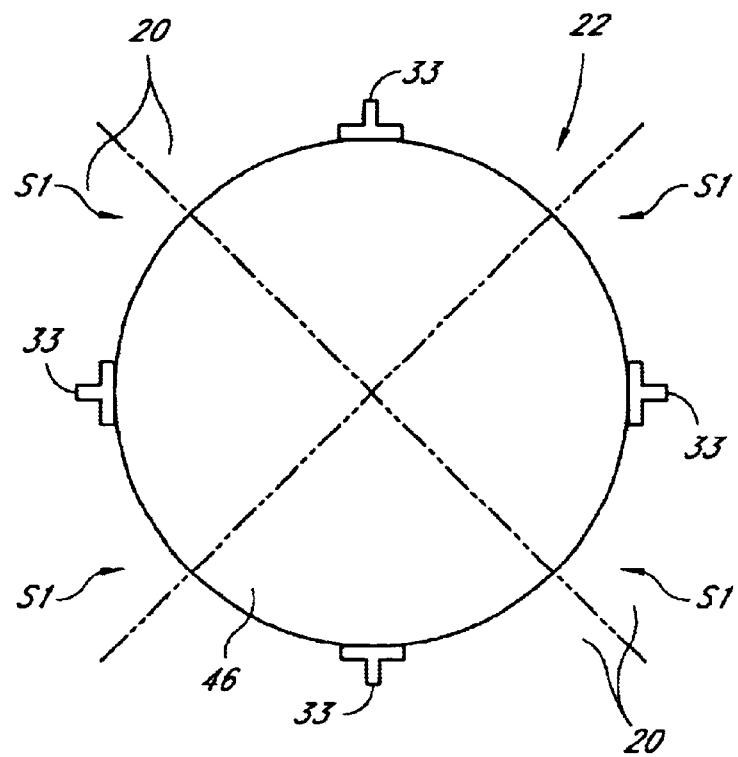
FIG. 15 is a plan view that shows another modified example of the water-storing block connecting member.
Figure 16:
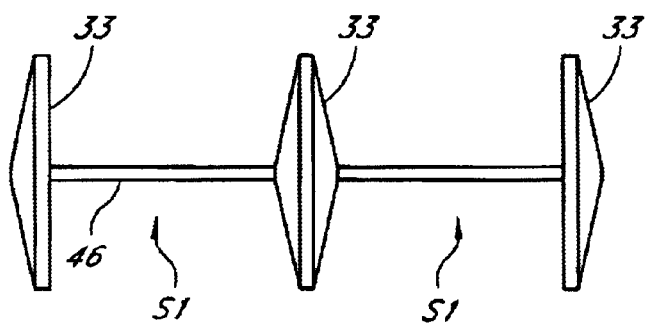
FIG. 16 is a front view of the water-storing block connecting member of FIG. 15.

(5) FIGS. 15 and 16 show a connecting member 22 in still another modified example.

Different from the connecting member in the modified example shown in FIG. 12, this connecting member 22 is not provided with assisting claws, and a connecting member main body 46 is formed into a virtually disc shape (not an annular shape). Other structures are the same as those of the connecting member of the above-mentioned modified example. With respect to the packaging means of the connecting member 22, an explanation can be given based upon FIG. 13 that shows the packaging means in the above-mentioned modified example (that is, FIG. 13 shows both of the packaging means of the connecting member of the above-mentioned modified example and the packaging means of the connecting member of another modified example).

The packaging means of this connecting member is the same as the packaging means explained on the connecting member of the above-mentioned modified example; therefore, the explanation thereof is omitted.

Moreover, the above-mentioned claws 33 can be applied to one-side claw type wherein those are formed on one plate face of the connecting member main body 36.

The connecting member of the one-side claw type is used when, for example, a plurality of the foamed styrol blocks 20 on the uppermost layer are face-to-face connected to each other. The material of the connecting member is not particularly limited to high-impact polystyrene, and may be, for example, polypropylene, or polycarbonate.

The shape of the connecting member main body 36, 46 is not limited to the above-mentioned shape.

The number of the claws 33 and the assisting claws 35 is not limited to the number shown in the above-mentioned modified example. Moreover, the size of the connecting member main body 36, 46 and the number of the claws 33 and the assisting claws 35 may be set different from those of the above-mentioned modified example so that the size of the another-member housing space SI and the size of the assisting another member housing space S2 may be set different from the sizes of the spaces in the above-mentioned embodiment.

The cross-sectional shape of the claws 33 and the assisting claws 35 is not limited to the T-letter shape, and may be, for example, a triangular shape.

The connecting member used for connecting the foamed styrol blocks 20 to each other in an EPS engineering method may be designed to structures used in the connecting member of the above-mentioned modified example and another modified example. The EPS engineering method refers to an engineering method wherein the adjacent foamed material blocks in the lateral direction are face-to-face connected, and the adjacent foamed material blocks in an up and down direction are also connected to each other so as to form a civil engineering structure; and this method is particularly effective in solving the problem of weak ground.

(6) With respect to the above-mentioned foamed resin, a foamed resin may be provided by making a resin impregnated with carbon dioxide gas or the like in a super critical state so as to be expand, and the resulting foamed resin, which has a fine, uniform foaming radius with a diameter in the range of 1 to 30 $\mu$m and a high strength, may be used. The application of this material is more preferable because it further increases the resistance against the soil pressure, and also increases the percentage of void to not less than 70%.

INDUSTRIAL APPLICABILITY

The rain-water storing permeation structure of the present invention is applicable to facilities, such as architectures like buildings, roads, water channels, parks and play grounds, factory sites as well as domestic sites.

What is claimed is:

1. A rain-water storing permeation structure comprising:

a water-shielding layer placed in a recessed section in the ground, said recessed section having a bottom and outwardly slanted side surfaces;

a water-storing layer comprising multiple layers of water-storing blocks which are made of a hard resin foam member having a specific gravity lower than water, wherein multiple water-storing blocks are placed side by side and one upon another using connecting members having claws, and an upper layer of said multiple layers comprises more water-storing blocks than does a lower layer, each block having an inner space and rigid walls, the water-storing layer being placed inside the water-shielding layer;

a lid layer formed on the water-storing layer, comprising a water-permeable layer made of a water-permeable material; and a surface layer covering said lid layer and being leveled substantially with said ground, said surface layer having an area wider than that of the bottom of the recessed section and maintaining its level by resisting the buoyancy of the water-storing layer when storing water therein.

2. The rain-water storing permeation structure according to claim 1, wherein the water-permeable material is a water-permeable polystyrene foam member.

3. The rain-water storing permeation structure according to claim 1, wherein the hard resin foam member is a polystyrene foam member.

4. The rain-water storing permeation structure according to claim 3, wherein the polystyrene foam member has a density in a range of 10 to 50 kg/m$^3$.

5. The rain-water storing permeation structure according to claim 1, wherein the water-shielding layer is made of a water-proof sheet.

6. The rain-water storing permeation structure according to claim 1, wherein the surface layer comprises a paved road having a width smaller than that of the water-storing layer.

7. The rain-water storing permeation structure according to claim 1, wherein the water-storing layer is disposed substantially parallel to the ground surface and the bottom surface of the recessed section of the ground.

8. The rain-water storing permeation structure according to claim 1, wherein the surface layer comprises a crushed stone layer, a gravel layer, and a soil layer toward a surface of the surface layer.

* * * * *